Dec. 14, 1943.   C. C. BENNETT   2,336,838
DYNAMOMETER
Filed May 5, 1941   5 Sheets-Sheet 1
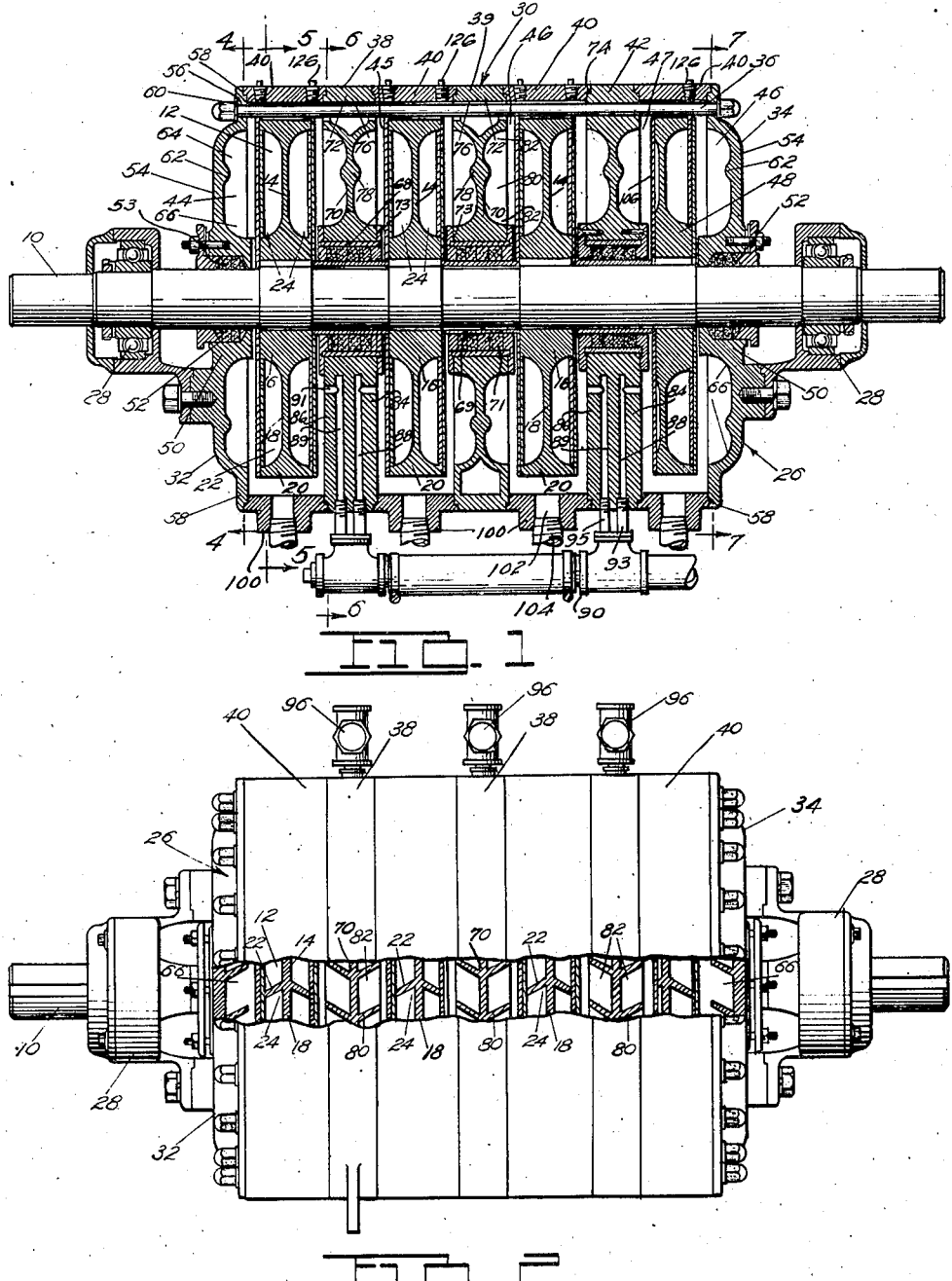
INVENTOR.
CLAUDE C. BENNETT
BY Gray & Smith
ATTORNEY.

Dec. 14, 1943. C. C. BENNETT 2,336,838
DYNAMOMETER
Filed May 5, 1941 5 Sheets-Sheet 2
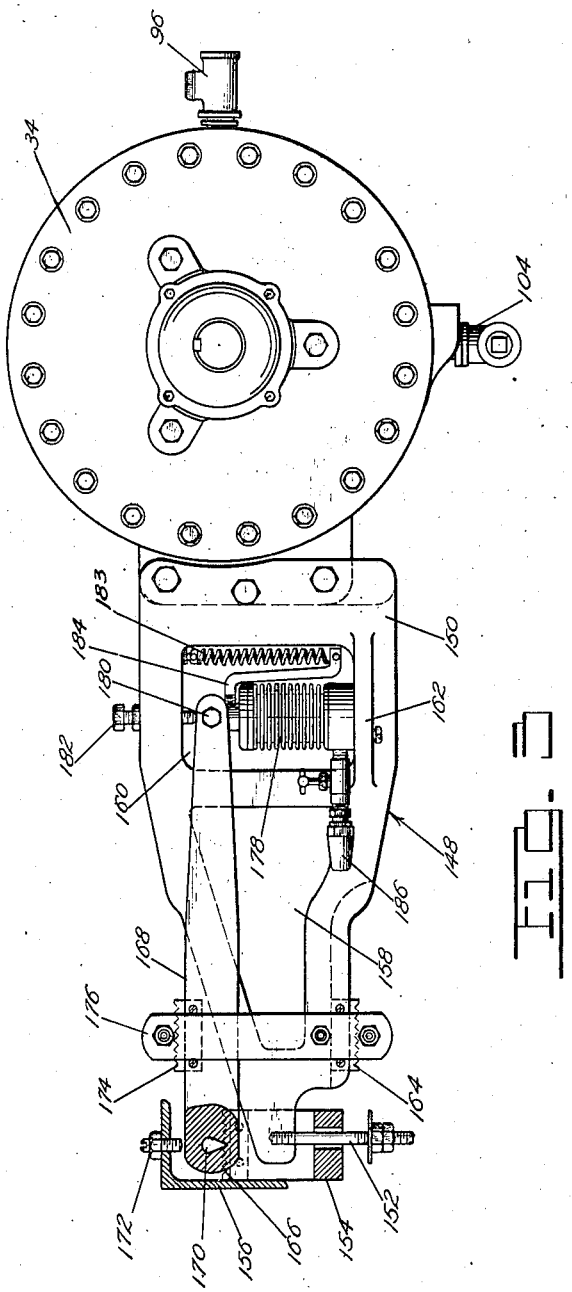
INVENTOR.
CLAUDE C. BENNETT
BY Gray & Smith
ATTORNEY.

Dec. 14, 1943. C. C. BENNETT 2,336,838
DYNAMOMETER
Filed May 5, 1941 5 Sheets-Sheet 3

INVENTOR.
CLAUDE C. BENNETT
BY
ATTORNEY.

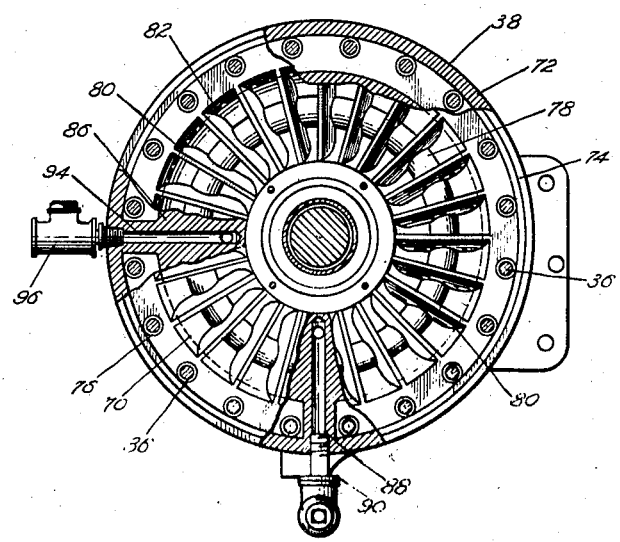
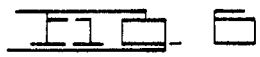
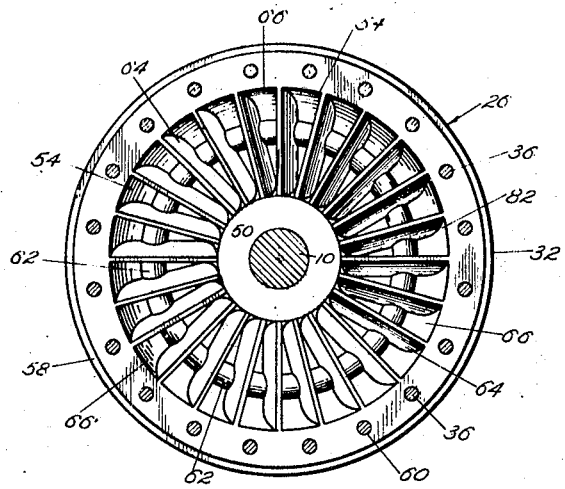
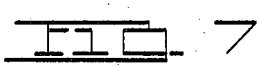
INVENTOR.
CLAUDE C. BENNETT

Dec. 14, 1943.  C. C. BENNETT  2,336,838
DYNAMOMETER
Filed May 5, 1941  5 Sheets-Sheet 5
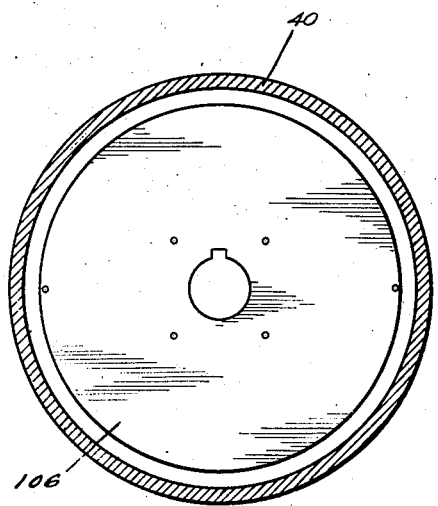
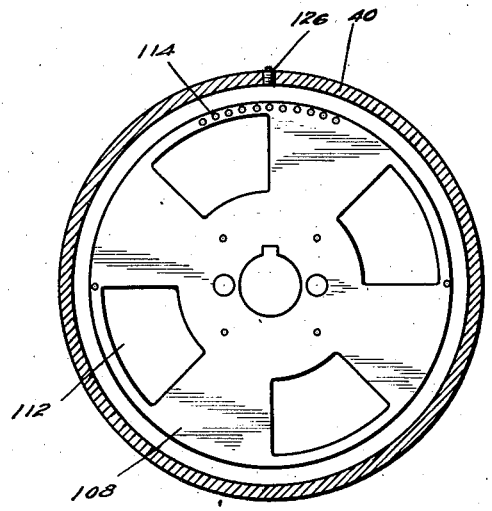
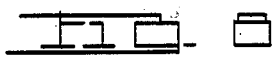
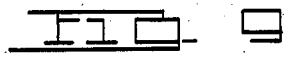
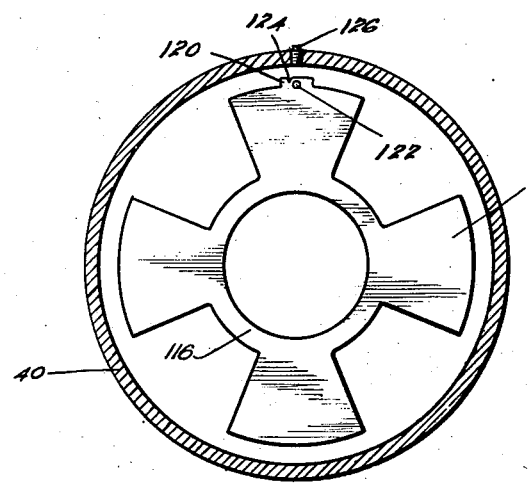
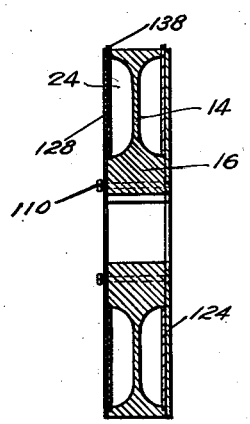
INVENTOR.
CLAUDE C. BENNETT
BY
ATTORNEY.

Patented Dec. 14, 1943

2,336,838

UNITED STATES PATENT OFFICE 2,336,838

DYNAMOMETER

Claude C. Bennett, South Bend, Ind.

Application May 5, 1941, Serial No. 391,900

9 Claims. (Cl. 188—90)

This invention relates to dynamometers and more particularly to absorption dynamometers.

Broadly, the invention comprehends a dynamometer of the absorption type including an oscillatory case enclosing a stator and a rotor, controlled water inlets and outlets for the case and a torque arm mounted on the case and connected to a measuring instrument.

An object of the invention is to generally improve dynamometers of the absorption type.

Another object of the invention is to provide an absorption dynamometer for accurately measuring power developed by a motor.

A further object of the invention is to provide an absorption dynamometer capable of absorbing variable torque and to maintain a substantially constant torque.

Still another object of the invention is to provide an absorption dynamometer having a plurality of spaced units each having independent rotor and stator elements capable of absorbing variable torque and of maintaining substantially constant resistance over a protracted period of time.

Another object of the invention is to provide an absorption dynamometer operative to maintain a true and steady torque for substantially any desired period of time.

Yet a still further object of the invention resides in the provision of a dynamometer having a plurality of spaced substantially isolated resistance units selectively operable in unison or individually or in combination with other units to produce a desired resistance.

Still a further object of the invention is to provide a dynamometer including a torque arm operative to compound the torque so that a delicate adjustment may be readily accomplished.

Yet a further object of the invention is to provide a dynamometer having a torque arm constructed to occupy but small space and to compound the torque so as to simulate a torque arm of greater length.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a vertical sectional view of a dynamometer embodying the invention.

Fig. 2 is a top plan view partly broken away and partly in section.

Fig. 3 is a side elevation illustrating the torque arm.

Fig. 6 is a sectional view substantially on the line 6—6 of Fig. 1, illustrating one of the stator plates.

Fig. 7 is a sectional view taken substantially on the line 7—7 of Fig. 1, showing the other end plate.

Fig. 8 is a fragmentary plan view of a spacer plate isolating longitudinally spaced sections of the dynamometer to in effect form longitudinally spaced dynamometer sections.

Fig. 9 is a plan view of a gate for the variable unit.

Fig. 10 is a plan view of the shutter for the variable unit.

Fig. 11 is a sectional view of the gate and shutter assembly.

Figure 4:
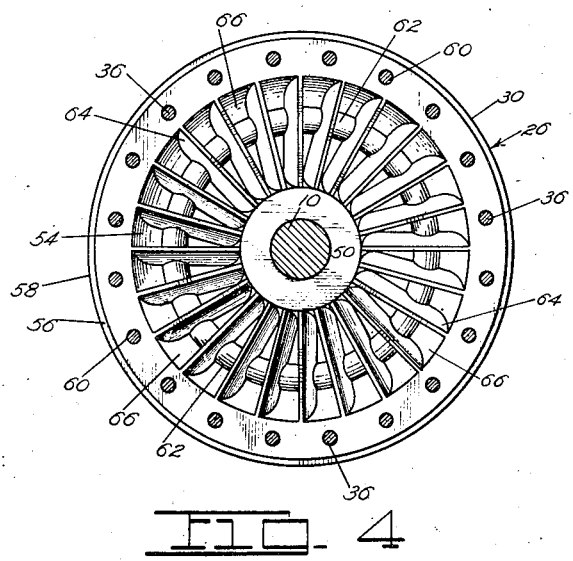
Fig. 4 is a sectional view taken substantially on the line 4—4 of Fig. 1, illustrating one of the end plates.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings for more specific details of the invention, 10 represents a driven shaft, the torque or other characteristics of which it is desired to ascertain. The shaft 10 has keyed thereon a rotor 12 including a plurality of rotor plates 14 arranged in spaced relation to one another.

Each of the rotor plates 14 includes a hub 16, having a bore for the reception of the shaft 10, a generally radially extending web 18 preferably centrally of the hub, a rim 20 carried by the web, and corresponding groups of radially extending vanes 22 arranged in oppositely disposed relation to one another on the sides of the web 18.

Figure 5:
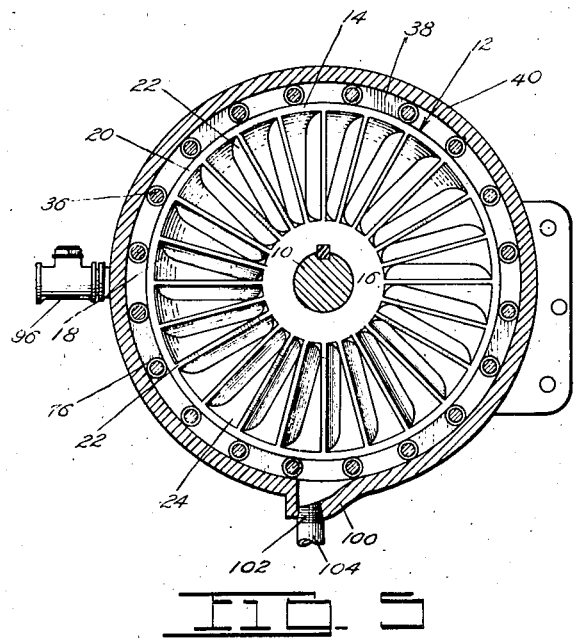
Fig. 5 is a sectional view taken substantially on the line 5—5 of Fig. 1, illustrating one of the rotor plates.

As illustrated in the left hand portion of Fig. 1 and in Fig. 5, the vanes 22 are preferably integral with the hub 16, web 18, and the rim 20, and are inclined angularly from the perpendicular with relation to the web 18 so as to provide pockets 24. The edges of the vanes in the respective groups are in planes common to the respective ends of the hub and the edges of the rim.

A stator 26 enclosing the rotor 12 is supported for oscillation on bearings 28 journaled on the shaft 10 in spaced relation to one another. The stator comprises a casing or housing including corresponding oppositely disposed end plates 32 and 34 having secured therebetween as by stay rods 36 a plurality of separator partitions or stator plates 38, 39 and 42 alternating with the rotor plates 14. A plurality of spacer rings 40 alternating with the stator plates 38 and 42 and the separator partition 39 divides the assembly into a plurality of axially spaced chambers 44, 45, 46 and 47 housing the rotor and provides suitable housings for auxiliary variable rotor plates.

The end plates 32 and 34 each includes a hub 50 having a bore for the reception of the shaft 10. The hub has therein a journal box 52 and a suitable packing 53 in the box for inhibiting seepage of water from the case past the shaft. The packing is held against displacement by a retaining ring suitably secured in the hub.

An annular end plate 32 carried by the hub 50 at the outer edge thereof has a flange 56 provided with an annular shoulder 58 and a plurality of spaced openings 60 for the reception of the stay rods 36. The inner face of the plate 32 is dished, and formed on this face is an annular boss 62 preferably semi-elliptical in cross section and a plurality of vanes 64 formed integral with the hub and the rim and providing in conjunction with the plate and the annular boss divided pockets 66. The vanes 64 on the end plate 32 are arranged in oppositely disposed relation to the corresponding vanes on the end plate 34.

Each of the stator plates 38, 39 and 42 includes a hub 68 for the reception of the shaft 10. A bearing 69 engages the shaft 10 and suitable packing 71 is interposed between the hub 68 and the bearing 69. The packing is held in place by suitable retaining rings 73. An annular web 70 preferably centrally disposed on the hub 68 supports a rim 72 having annular shoulders 74 on each edge thereof and spaced transverse openings 76 for the reception of the tie rods 36.

The web 70 has on its sides oppositely disposed annular bosses 78 and radial vanes 80 integral with the hub and rim and divided by the annular bosses so as to provide pockets 82. The vanes are inclined from the web and are reversely disposed with relation to the vanes 22 on the adjacent rotor plates 14.

The webs 70 of the stator plates 38 and 42 are each provided with radial ribs 84 and 86. One of each of the ribs 84 of the stator plates 38 and 42 are bored radially to provide water inlet passages 88 and 89 extending from longitudinally extending outlet passages 91 through the rim 72. Secured to the outer end of inlet passages 88 and 89 are a plurality of conduits 93 and 95 respectively which if desired may each be provided with shutoff valves. The conduits 93 and 95 are connected by suitable fittings 90 and a hose to a source of water supply controlled as by a conventional valve, not shown.

As illustrated in Fig. 6, the other rib 86 of each of the stator plates 38 and 42 extends inwardly relative to the web 70 and is bored axially to provide air intake passages 94 controlled as by a valve 96 communicating with the axially spaced chambers 44, 45, 46 and 47.

Each of the spacer rings 40 encircles one of the rotor plates 14, and each of these rings has on its edges corresponding annular shoulders complementary to the annular shoulders 74 on the end plates and stator plates so as to interlock therewith and completely seal the case.

Each of the spacer rings 40 has an offset portion 100 provided with an outlet opening 102 having secured therein a nipple 104, connected by suitable fittings and hose to a drain with a conventional valve, not shown, interposed for control thereof.

The rotor plates 14 in the axially spaced chambers 44, 45, 46 and 47 are suitably attached to the shaft 10 and are provided with suitable cooperating shields more clearly illustrated in Figs. 9 to 11 whereby the energy dissipated by any of the rotors can be varied at will. If desired, one side of a rotor plate 14 can be closed off by a face plate 106 as illustrated at the right hand end portion of Fig. 1 and in Fig. 8 to vary the resistance of an axially spaced unit. The plate 106 may be attached to the side of the rotor plate 14 in any desired manner as by screws, rivets, welding, etc. It will also be apparent that the web 18 of one of the rotor plates 14 can be positioned closer to one side to vary the energy dissipating characteristics of the unit. It will of course be understood that one side of the rotor plate can be finished smoothly thereby eliminating the necessity for employing the plate 106.

The pockets 24 formed in the rotor plates may be covered by a plate 108 secured thereto as by bolts 110. The plate 108 is provided with openings 112 affording communications between the associated chambers 44, 45, 46 and 47 and the pockets 24 of the rotor plates. Formed on the rotor plates 108 adjacent the periphery thereof are a plurality of spaced depressions 114.

A shutter 116 rotatable on the hub of the rotor plates has a plurality of radially extended fins 118 for varying the openings 112, and a lug 120 arranged on the perimeter of one of the fins has an embossed protrusion 122 adapted to cooperate with the depressions 114 to hold the shutter in adjusted position. The shutter 116 may be supported in a groove formed in the hub in such a manner as to be rotatable thereon to lie closely adjacent the rim 20 and vanes 22.

The lug 120 also has a notch 124 for the reception of an adjusting tool which may be inserted through an opening 126 in the casing of the stator 26. By adjusting the shutter 116 the communications between the chambers 44, 45, 46 and 47 and the pockets 24 formed in the rotor plates 14 may be varied to increase or decrease the resistance of the dynamometer.

A torque arm indicated generally at 148 in Fig. 3 includes a short stout arm 150 bolted or otherwise secured to the stator casing 30 for movement therewith. This arm is limited in its movement by a stop 152 secured to the free end of the arm and adapted to cooperate with a bracket 154 fixedly secured to a frame member 156.

The arm 150 is cut away as indicated at 158 and 160 to reduce the weight thereof and a web 162 is formed on the side of the arm preferably below the cutaway portion 160. Suitably secured on the lower edge of the arm adjacent the free end thereof is a toothed surface 164. The bracket 154 has upon its top a toothed surface 166, and an arm 168 has on one of its ends a knife edge bearing 170 received by and adjustable on the ratchet 166 and the arm 168 is retained against displacement by a set screw 172 mounted in the frame.

The arm 168 has thereon a toothed surface 174 arranged in oppositely disposed relation to the ratchet 164 on the arm 150, and a link 176 adjustable on the ratchets connects the arms. The other end of the arm 168 is extended toward the casing of the stator 26 substantially centrally of the cutaway portion 160 of the arm 150, and a bellows 178 seated on the web 162 within the cutaway portion 160 and secured against displacement is suitably connected to the arm 168 as at 180. A set screw 182 mounted in the arm 150 determines the retracted position of the arm 168 and a retractile spring 183 connected to the bellows as by a bracket 184 serves to extend the bellows and also to return the arm 168 to its retracted position, and the bellows 178 is connected as by a fluid pressure delivery pipe 186 to an indicating instrument, not shown, suitable to register the torque.

In a normal operation, the shaft 10 carrying the rotor 12, and supporting the stator 26 for oscillation is driven from the crankshaft of an engine, a motor, or other apparatus, the torque or other characteristics of which it is desired to test. The shaft 10 may be connected to a tachometer for indicating the speed of the shaft, and any suitable type of pressure gauge, preferably one calibrated in units of torque is connected through fluid pressure means to the torque arm 148 mounted on the casing of the stator 26.

Assuming that the dynamometer is connected to an engine and to measuring instruments as hereinabove described, the operator opens the outlet valve and closes the inlet valve, the apparatus under test is then set in motion. After operating for a sufficient period of time to completely displace substantially all of the water from the unit, the outlet valve is closed and the inlet gradually opened. The engine under test is then speeded up, and maintained at a constant rate of speed and then the intake valve is further opened gradually until the torque gauge begins to indicate the pressure developed.

When water is admitted into the casing 30 it is distributed between the stator plates 38, 39 and 42 and the rotor plates 14 and projected by centrifugal force outwardly toward the periphery of the casing. Because of the vanes on the respective rotor plates and stator plates, and particularly because of their relation to one another, the water is agitated to a very high degree.

This intensified turbulence of the water may result in creation of a partial vacuum in the casing 26 and to overcome this the casing is provided with an air inlet 94. The friction between the water and the rotor and stator plates results in heating the water to a very high temperature and it is by this means that the energy development by the engine under test is absorbed by the dynamometer.

It will be understood that by adjusting the shutter 116 the axially spaced sections 44, 45, 46 and 47 of the dynamometer may be regulated to increase or decrease the load at the will of the operator. This means for varying the load is highly important when testing apparatus of different torque and speed characteristics.

It is also to be observed that the torque arm 148 mounted on the oscillable casing 26 has a distinct advantage in that it can be confined in a very small space and can be so regulated or adjusted as to compound the torque and that because of its particular structure it is susceptible of delicate adjustment.

When releasing the water from the casing 26 to decrease the torque or lower the power absorption thereof a partial vacuum may be created in the casing and in that event air is admitted through the air inlet 94 controlled by the valve 96. The load on the engine may be varied by the operator simply through manipulation of the water inlet and outlet controls of the dynamometer, and the speed of the engine may be governed by operating the engine controls, and through the medium of a definitely fixed water flow through the inlet and outlet of the various sections of the dynamometer, the heat is dissipated, permitting a continuous test over an unlimited period of time.

The load on the engine may be varied by regulating the rate of discharge of water from the various sections of the dynamometer, or by regulating the rate of admission of water into the various sections of the casing 26. In completing the test the engine is operated with wide open throttle and the controls of the dynamometer set so as to maintain a constant load on the engine. In this connection attention is directed to the fact that one or more of the sections 44, 45, 46 or 47 of the dynamometer can be operated while the remainder of said sections of the dynamometer are substantially inactive to produce a substantially predetermined resistance.

Under these conditions the operator takes a reading of the tachometer and of the torque gauge, and with these two factors known, the horse power of the engine may be readily computed in accordance with established practice.

While this invention has been described in connection with certain specific embodiments, the principle involved is susceptible of numerous other applications that will readily occur to persons skilled in the art. The invention is, therefore, to be limited only as indicated by the scope of the appended claims.

I claim:

1. A dynamometer comprising a shaft, an oscillatory case mounted on the shaft, means including stator plates separating the space within the case into a plurality of separate axially spaced compartments, vaned rotor plates carried by the shaft and extending into each of the spaced compartments, cover plates for the rotor plates having openings therethrough, and shutters for varying the effective size of said openings.

2. A dynamometer comprising a shaft, a stator including a pair of corresponding end plates, an assembly of stator plates and spacer rings arranged in alternate relation to one another between the end plates, vaned rotor elements carried by the shaft and arranged in alternate relation to the stator plates, cover plates for the rotor elements having openings therethrough, shutters for varying the effective size of said openings, water inlet means associated with the stator plates, and water outlet means associated with the spacer rings.

3. A dynamometer comprising a stator including a case having corresponding end plates provided with hubs for the reception of a shaft, an assembly of stator plates and spacer rings arranged in alternate relation to one another between the end plates, means for clamping the assembly between the end plates so as to seal the casing and separate the space within the casing into a plurality of axially spaced compartments, separate rotor plates carried by the shaft and extending into each of the separate compartments, a cover plate for one of the rotor plates having openings therethrough, and a shutter for varying the effective size of said openings.

4. A dynamometer comprising a rotor blade including a hub, a web on the hub, a rim on the web, radial vanes on the web connecting the hub and rim, a cover plate over the radial vanes having openings therethrough, and a shutter for varying the openings.

5. A dynamometer comprising a rotor blade including a hub, a web on the hub, a rim on the web, radial vanes on the web connecting the hub and rim, a cover plate over the radial vanes having openings therethrough, and a rotatable shutter for varying the openings.

6. A dynamometer comprising a rotor blade including a hub, a web on the hub, a rim on the web, radial vanes on the web connecting the hub and rim, a cover plate over the radial vanes fixedly secured to the hub and having openings therethrough, and a shutter rotatable on the hub for control of the openings through the plate.

7. A dynamometer comprising a rotor blade having pockets in one side thereof, a cover plate having openings positioned adjacent the pockets, a shutter to vary the effective size of said openings, and means for varying the position of the shutter to control the entrances of the pockets.

8. A dynamometer comprising a shaft, an oscillatory case mounted on the shaft, means including stator plates separating the space within the case into a plurality of separate axially-spaced compartments, rotor plates having hubs fixed to the shaft, radially-extended rims carried by the hubs and terminating in webs, vanes carried by the web connecting the hub and rim to provide spaced chambers in each of said compartments, shutter means for controlling said spaced chambers, and separate manually-operable means for actuating the shutter means to vary the resistance exerted on the shaft in each of said spaced compartments.

9. A dynamometer comprising a shaft, an oscillatory case supported on the shaft, a plurality of axially-spaced stator members carried by the case and dividing the space therein into a plurality of spaced separate compartments, separate rotor members carried by the shaft and extending into each of the compartments, each of said rotor members having radially-spaced hub and rim members interconnected by webs, vanes carried by the webs connecting the hub and rim members to provide a plurality of chambers in each of said compartments, and manually actuated shutter means controlling said chambers to vary the resistance developed in each of said separate compartments.

CLAUDE C. BENNETT.